United States Patent [19]

Yiu

[11] Patent Number: 5,422,143
[45] Date of Patent: Jun. 6, 1995

[54] COATING COMPOSITION

[75] Inventor: Mok Yiu, Hong Kong, Hong Kong

[73] Assignee: Magnumas Coatings (M) SDN BHD, Cameron Heights, Malaysia

[21] Appl. No.: 329,459

[22] Filed: Oct. 26, 1994

Related U.S. Application Data

[63] Continuation of Ser. No. 210,098, Mar. 16, 1994, abandoned, which is a continuation of Ser. No. 960,551, Oct. 13, 1992, abandoned.

[30] Foreign Application Priority Data

Aug. 11, 1992 [MY] Malaysia .................. PI 9201435

[51] Int. Cl.$^6$ .................. B05D 3/02; C04B 12/04
[52] U.S. Cl. .................. 427/397.8; 106/14.21; 106/18.12; 106/631; 106/632; 106/633; 106/635; 106/DIG. 2; 252/62; 252/601
[58] Field of Search .................. 106/14.21, 18.12, 631, 106/632, 633, 635, DIG. 2; 252/62, 601; 427/397.8; 428/920, 921

[56] References Cited

U.S. PATENT DOCUMENTS

| 4,277,355 | 7/1981 | Farcnik | 252/62 |
| 4,479,824 | 10/1984 | Schutt | 106/14.21 |
| 4,851,044 | 7/1989 | Stawinski | 106/18.12 |
| 4,867,791 | 9/1989 | Jaklin | 106/14.21 |
| 4,869,752 | 9/1989 | Jaklin | 106/14.21 |
| 4,869,753 | 9/1989 | Jaklin | 106/14.21 |
| 5,045,385 | 9/1991 | Luckanuck | 106/18.12 |

FOREIGN PATENT DOCUMENTS

| 1796230 | 9/1968 | Germany . |
| 58-041782 | 3/1983 | Japan . |
| 737475 | 12/1978 | U.S.S.R. . |

OTHER PUBLICATIONS

Derwent Publications Ltd., London, GB; AN 83-37858K, Week 16, & JP-A-58 041 782 (Shinagawa Fire Brick), 11 Mar. 1983.

*Primary Examiner*—Anthony Green
*Attorney, Agent, or Firm*—Ladas & Parry

[57] ABSTRACT

This invention provides an improved water-based coating composition. The said coating composition comprises a light mineral such as expanded perlite, dilute sodium metasilicate solution, and a metal oxide. The coating composition of the invention has one or more of the following qualities when cured: non-poisonous; odorless; water resistant; non-conductive; heat resistant; acid resistant; alkaline resistant; rust resistant; ability to withstand burning; and ability to integrate with cement.

10 Claims, No Drawings

COATING COMPOSITION

This is a continuation of application Ser. No. 08/210,098, filed on Mar. 16, 1994, now abandoned which is a continuation of Ser. No. 07/960,551 filed Oct. 13, 1992, now abandoned.

This invention relates to water-based coating compositions, especially suitable for industrial use.

Steel has wide usage in the industrial sector. The greatest drawback of steel is its tendency to rust easily. Steel conducts electricity and heat, and the difference between its contracted state when cooled and expanded state when heated is very great. Though there are various types of rust-proof paints in the market, they generally emit an unpleasant odour. Moreover, the aromatic hydrocarbons used are poisonous, and the period of rust-resistance provided is short. Though iron is non-flammable, the paint used to coat iron is flammable, and can thus be a fire hazard. An alternative to coating is to use a chroming process as a means of rust-proofing materials, for example using chromed zinc, aluminum, tin, or magnesium. Chromed iron, though rust-proof, still conducts heat, and is not acid resistant. It cannot withstand burning, and becomes rusty after a period of time. Thus all of the above mentioned materials have defects which greatly limit their use as iron coating materials.

The present invention provides an improved water-based coating composition, having the following qualities upon dry heating at high temperatures:
1. ability to withstand burning;
2. rust resistant;
3. non-poisonous;
4. odourless;
5. water resistant;
6. non-conductive;
7. heat resistant;
8. acid resistant; and
9. alkali resistant.

The coating composition can withstand submergence in cold water after burning at high temperatures, without any explosion, formation of cracks or decolorization. The coating composition has the ability to integrate with cement for building purposes, especially for protection against earthquakes.

The new coating composition can be used with other paints to provide additional protection.

The coating composition of the invention, when glazed, becomes smooth and glossy like a ceramic coated iron surface, thereby widening its usage outside the industrial sector.

The coating compositions of the invention are suitable for use in the heavy industrial sector, including use in the heat and pipe lines in chemical factories, steam ships, large oil tanks, vehicles, trains etc., owing to their multi-functional ability to withstand submergence upon heating, and to integrate with cement.

The coating composition of the invention has the appearance of a ceramic coating when glazed, thus making it suitable for use in swimming pools, washrooms, cold rooms and offices.

The novel features of the coating composition according to the invention, and its corresponding advantageous effects with reference to prior art, will now be enumerated and described:

1. Non-poisonous

The raw materials used in formulating the coating composition of the invention are minerals. Poisonous raw materials like asbestos and lead compounds, arsenic compounds and cyanide are not used, and neither are petrochemical materials. Thus during burning and oxidation of the coating composition of the invention, no poisonous substances will be emitted. Thus the present invention provides an environmentally clean coating material for industrial use.

2. Odourless

In general, the process of painting for purposes of coating as practised in the prior art causes the emission of an unpleasant odour. If the area to be painted is wide, and proper ventilation is not available, the odour could cause suffocation. Even when an odourless paint is used, it still emits an odour when burnt. Further, the usage of red lead compounds as colouring is not merely odorous but also poisonous. The coating composition of the present invention is completely odour free, even when burnt at high temperatures.

3. Water Resistant

This is a feature of great importance in painting materials. Oils and emulsions which are not water resistant result in peeling off, rusting, blackening or the growth of algae, moss or fungi. The coating composition of the present invention, after dry heating, is highly water resistant, and even when left submerged in water for up to 18 months, no peeling or rust formation is observed. This is because the coating composition attaches firmly to any surface, and has strong resistance to water. The coating composition of the invention, when left in wet areas shows no evidence of blackening, or of algal, moss or fungal growth. If the coating composition is added together with paints, glaze or cement, a non-rust period of 5 to 10 years is possible.

4. Non-conductivity

The coating composition according to the invention is non-conductive, owing to the non-conductive nature of the materials used in the formulation of the said coating composition. Non-conductivity is an important feature in the industrial sector, especially in oil tank vehicles which need to be resistant to electricity and static electricity in order to reduce the risk of fire.

5. Heat Resistant

The obvious defects of iron and steel are their ability to rust, and to conduct heat. In order to remedy this shortcoming, it is advisable to use coatings which are not only rust proof, but which also have excellent heat resistant qualities. These functions are fulfilled by the coating composition of the present invention. The white coloured coating composition functions best for heat resistance. Experiments were carried out to illustrate this using two flower pots, in both of which were placed thermometers. One was covered with a zinc-iron plate coated in white, and the other with an uncoated zinc-iron plate. The flower pots were then placed in the sun for one hour, after which temperatures were read. The thermometer covered with the white-coated plate showed a temperature of 36° C., while the one covered with the zinc-iron plate showed a temperature of 51° C., giving a difference in temperature of 15° C. If placed under sunlight for 20 minutes, the increase in temperature is between 32°–39° C. While the temperature of the white-coated plate remains constant at 36° C., the temperature of the zinc-iron plate continues increasing with continuous heating. In view of this, it is concluded that the white coating composition according to the invention are better heat-resistant materials. Even a thin layer coated onto a thick layer of ceramic provides better heat resistance as compared to a thick layer of ceramic. This was tested using an electric ceramic container. When the water in the container was at boiling point, the cover of the ceramic container was too hot to be touched, whilst the cover of the white-coated container could still be touched. The heat resistant quality of the coating composition of the invention has wide industrial application. Using the said coating composition on the interiors of buses, trains, cars and ships provides heat resistance, and reduces the requirement for air conditioning. The ability to resist heat is particularly useful in car oil tanks. A test of the evaporation process of petrol was conducted. It was found that petrol at 40°-50° C. evaporation point resulted in a loss of 10%. If a car is parked under the sun for a period of time, the temperature of its oil tank would exceed 40° C. As such the loss could be 10% per period of parking. This results in wastage and unnecessary petrol expenditure. However, should the car oil tank be painted white, its temperature would not exceed 36° C. regardless of the length of time it is in the sun. Remaining at a constant temperature below 40° C. is a definite saving with regard to petrol loss. Heat resistance is also needed in large oil tanks, and oil and gas pipelines, to maintain reasonable temperatures.

6. Acid Resistant

The coating composition of the invention, upon submergence in concentrated sulphuric or nitric acid for ten days remains unchanged, thus proving its high resistance to acids. However, the coating composition does not exhibit equal resistance to hydrochloric acid. The chlorine component of hydrochloric acid (HCl) reacts chemically with the sodium component of the coating composition to form the salt sodium chloride (NaCl). When submerged in 37% HCl, the coating remains unchanged for two days, after which the surface of the coating cracks, but continues to remain undissolved. The industrial usage of nitric and sulphuric acids is very wide, especially in chemical factories which comprise one third of the industrial sector. The contact of iron goods with acids causes corrosion and rust formation. However, coating these goods with the coating composition of the invention protects them from acid corrosion. This is also true for chromed steel materials.

7. Alkali Resistant

Testing was done wherein the coating composition of the invention was submerged in soap solution for 15 days. No change was detected, thus proving the alkali resistant quality of the coating composition.

8. Rust Resistant

Tests were conducted whereby the coating composition of the invention was submerged in salt water for over 15 days. The results yielded no change in the coating material. If the density is insufficient, or the layers at the edge are damaged, then the defective or damaged part of the coated iron was found to be rusty. Well-coated iron was found to withstand submergence for over a month. This exhibits the rust resistant quality of the coating composition of the invention. If the said composition is coated onto cement and submerged in salt water for over six months, the coating was found to remain clear. The coating composition, when used in addition with paints, cement or glaze, forms excellent rust resistant materials with the potential ability to withstand rust for 5 to 10 years.

9. Ability to withstand burning

The coating composition of the invention has the ability to withstand continuous burning. Submergence in cold water subsequent to burning does not cause cracking or decolorization of the coating composition. The coating compositions of red and white type have undergone successful experiments, whereby repeated burning for 20–30 minutes was carried out. Subsequently, the coatings were submerged in cold water. The coating on the thinner iron plate was burnt red without bending. When placed in water, there was no cracking or change of colour. The coating on the thicker iron plate when placed in water bubbled but did not peel off, and did not show a change of colour. It is thus concluded that in spite of the sudden decrease in temperature from a few hundred degrees to about ten degrees, and the great difference between the contracted state when cooled and the expanded state when heated, the coating composition of the invention exhibited no cracking or change in colour. Commonly used materials like chromed metals and stainless steel cannot withstand burning without cracking or changing form. The white and red type coating compositions, when coated onto car exhaust pipes, have remained intact without peeling off for periods of up to a year. The only change observed was a slight discoloration of the white colour. However, the red coloured coating remained unchanged. The ability to withstand burning for long periods of time shows the structural strength of these coatings. When coated onto gas stoves, the outer layer remains sound and good in the central support area sustaining continuous burning. No damage was observed, even after a period of one year. The ability of the coating composition of the invention to withstand burning can be put to use in the coating of heat and steam pipes which by nature are continuously heated or burnt. The coatings can also be used as fire-proof materials. The coated foundation irons of steel structures, bridges and factories, including the inner fixtures, when completely burnt by fire, were found to remain undamaged, and could be re-used, thereby reducing loss due to fire. The coating composition is particularly useful in steam ships, airport hangars, harbours and godowns. The coating composition, when painted on large oil tanks, is fire resistant, as the protective layer of the iron is of ceramic composition and is heat proof. During a fire, the coatings prevent instant burning and explosions, thus allowing time for emergency measures to be taken.

10. Ability to integrate with cement.

The coating material of the invention, which is of mineral composition, can be integrated with cement in buildings as an earthquake resistance measure, owing to the ability of said coating composition to withstand burning, combined with its qualities of acid, alkali, water and rust resistance. The composition is useful for coating foundation irons. Recently there came into use a black fluid coated onto foundation irons for rust resistance purposes. As the said fluid is a petrochemical product, it can age easily. The coating material of the invention, which is of mineral composition, can match cement and can be integrated with cement for long periods of time. Such an integration is earthquake resistant, as the coated foundation irons integrated with cement remain upright after an earthquake. This reduces the risk of collapse. The coated integrated foundation irons may remain unchanged for 10–100 years. As such, the coating composition of the invention is beneficial in building engineering.

The water-based coating compositions of the invention comprise (a) a heat-resistant metal oxide which is ferric oxide or an oxide of titanium and (b) a siliceous material selected from the group consisting of expanded perlite, feldspar and diatomaceous earth, both (a) and (b) being present in finely divided form, dispersed in an aqueous solution of an alkali metal silicate. The materials used in formulating the water-based coating composition of the invention are preferably as follows:

1. Expanded Perlite
   A. Chemical Composition
      | | | | |
      |---|---|---|---|
      | $SiO_2$ | 73% | $Al_2O_3$ | 14.9% |
      | $Na_2O_3$ | 3.15% | $K_2O$ | 4.9% |
      | $MgO$ | 1.54% | $CaO$ | 1.11% |
      | $Fe_2O_3$ | 1.07% | $H_2O$ | (105%) 0.60% |
      | Loss on Ignition | | | 1.29% |
   B. Physical Properties
      | | |
      |---|---|
      | Colour | White |
      | pH | 7.0 |
      | Specific Gravity | 2.3 |
      | Specific Heat | 0.2 |
      | Bulk Density | 100–200 kg/m$^3$ |
      | Refractive Index | 1.5 |
      | Melting Point | 1260° C. |
      | Solubility | Insoluble in acid and alkali |
      | Light capacity | Used in wide temperature zone |

Odourless and soft to touch
      Strong chemical stability
      Heat resistant and retains heat
      Non-corrosive and non-inflammable Other materials suitable for use as the silica or aluminosilicate component are diatomaceous earth, feldspar and similar minerals.

2. Sodium Metasilicate
   A. Chemical Composition
      (a) $Na_2SiO_3$
      (b) $Na_2SiO_3.9H_2O$
      (c) $Na_2Si_4O_9$
   B. Physical Properties
      Melting Point (a) 1018° C. (b) 48° C.
      Soluble in water and alkali
      Not soluble in ethyl alcohol and acids.
      $Na_2SiO_3.9H_2O$ in drum form with suitable water concentration is preferred. Each drum has a preferable weight of 330 kg, inclusive of weight of drum. $Na_2SiO_3$ is also suitable for use.
3. Titanium Oxides
   A. Chemical Composition
      (a) $Ti_2O_3$
      (b) $TiO_2$
      (c) $TiO_3$
   B. Physical Properties The colour of (a) and (c) is black. The yellow coloured compound is not used, instead of which is used compound (b) which is white. The Specific Gravity of (b) is 3.95, and the melting point is 1550° C. It is soluble in concentrated sulphuric acid, but insoluble in water.

4. Ferric Oxide Red, Iron Oxide Red
   A. Chemical Composition
      $Fe_2O_3$
   B. Physical Properties
      | | |
      |---|---|
      | Specific Gravity | 5.12–5.24 |
      | Melting Point | 1548° C. |
      | Soluble in acid but not in water. | |

In general, titanium oxide of the formula $TiO_2$ or $Ti_2O_3$ are used, as these two compounds are in powder form. Other oxides or colouring materials can be used in the same proportion.

Perlite powder and sodium metasilicate are preferably used in combination with the aforementioned oxides.

The preferred formulation of the coating composition according to the invention will now be disclosed.

1. Expanded Perlite

Represented in simple form by the chemical formula $R''Al_2O_3.7SiO_2$.

The perlite is processed through burning and is subsequently crushed into a powder having a low specific gravity of between 0.24 to 0.34. It is preferably not more than 80 kg per cubic meter.

2. Sodium Metasilicate

Sodium metasilicate is used. Each drum has a standard weight of 330 kg.

It is then diluted two-fold in water to form a solution.

3. Preferred metal oxide components (a) Titanium Oxides (white), preferably mixed with the expanded perlite and the diluted sodium metasilicate solution in the weight ratio of 4:3:16.

(b) Ferric Oxide (red), preferably mixed with the expanded perlite and the diluted sodium metasilicate solution in the weight ratio of 4:3:17.

The weights are obtained by calculation. Thus 3 kg expanded perlite powder may be used with 4 kg ferric oxide powder and a further 17 kg dilute sodium metasilicate. The above components are mixed well so that the solid powder components are dispersed in the solution of the sodium metasilicate in water in order to produce the preferred formulation shown above.

4. The afore-described formulation is subsequently coated onto a clean non-chromed steel sheet. It is then cured by calcining for, e.g. about half an hour in a flame, with the temperature of 500°–800° C. The heating time depends on the thickness of the steel sheet, a thin sheet requiring only 10 minutes of heating. The sheet can be put to use upon cooling. To avoid blackening by charcoal flames, the fuel used for heating should preferably be gas or electricity. If coating is done on wood materials, it needs to be heated for about 1 hour in a flame with the temperature of about 350° C. In general, rust and oil contents have to be removed prior to recoating. Coating by dipping can be used. After dipping, the substrate should preferably be wind-dried to keep off additional heat which might result in bubble-formation. This method produces a better end-product.

5. Upon heating, the coating material undergoes a chemical change and is cured. The coating solidifies and becomes firm and resistant to water and acids.

The above product, having undergone the heat of combustion, produces a ceramic coating compound integrated with the iron.

With the additional coating of paint, cement or glaze on the surface of the upper layer, its anti-rust capacity is greatly increased.

The product theoretically needs heat energy to produce the chemical reactions and chemical decomposition which expedite the formation of the resistant effect against water and acids. When the fire spraying method cannot be used, or when the coated materials are fixed and immovable, a dry heated coating can be applied, provided that it is thinly coated. The method of submergence coating cannot be used, as this may thicken the coating, resulting in difficulty in drying by sunlight or winddrying. During coating, the material has to be protected from rain. Even when dried, a lapse of 24 hours is necessary to ensure resistance against water. This is because the resistance only becomes effective after completion of the chemical decomposition process. It thus requires some time. When dried in this manner, the resistance initially shown against water and acids is not as good as when the coating is dried through burning and heating. After a lapse of time, during which the chemical reaction or decomposition process has been completed, the effect of resistance obtained after the coating has been thoroughly dried is the same as the effect when the coating is dried through burning and heating.

Inner walls, wood and iron can generally be coated in a manner similar to painting. White coating material, asbestos, can be used on heat pipes, steam pipes and other such items. A heat reducing substitute also does not need to be dried by heating. The red coating materials, after exposure to sun for 2–3 hours, become water-resistant. The white coatings, which have better heat resistant effect, are slower, and thus require exposure to sunshine for a period of 5–6 hours in order to be effectively water-resistant. When the coating materials are used outdoors, care has to be taken to protect the materials from rain when they are still wet, so as to avoid fading of the colour.

If the coatings are being used as undercoatings for rust resistance, spray coating or painting can be done after the coatings are thoroughly dry.

The merits of the coating composition according to the invention were evaluated by STANDARDS AND INDUSTRIAL RESEARCH INSTITUTE OF MALAYSIA through a series of tests, the results of which are illustrated in the following tables: Samples used were red and white coatings, coated onto (1) iron plate, (2) glass panel

TABLE 1

| Type of Test | Requirement | Results |
| --- | --- | --- |
| 1. Water Resistance Test (After 18 hours, soaking) | | |
| a) Red coating on glass panel | | |
| i) Immediately after removal from the Water | No crinkling, blistering, cracking and peeling | No obvious defects on the coating. The immersion water turned slight cloudy. |
| ii). After 2 hours | Variation of gloss, cloudiness, whitening, degree of discoloration not larger than control sample. No abnormality | The coating film turned powdery |
| b) White Coating on glass panel | | |
| i). Immediately after removal from water | No crinkling, blistering, cracking and peeling. | Complied with the requirement. |
| ii) After 2 hours | Variation of gloss, cloudiness, whitening, degree of discoloration not larger than control sample. No abnormality | Complied with the requirement. |

TABLE 2

| Type of Test | Requirement | Results |
| --- | --- | --- |
| 1. Water Resistance Test (After 18 hours, soaking) | | |
| c) Red coating on iron plate | | |
| i) immediately after removal from the Water | No crinkling, blistering, cracking and peeling | No obvious defects on coating except for a slight dissolution of pigment coating. |
| ii). After 2 hours | Variation of gloss, cloudiness, whitening, degree of discoloration not larger than control sample. No abnormality | Complied with the requirement. |
| d) White Coating on glass panel | | |
| i). Immediately after removal from the water | No crinkling, blistering, cracking and peeling. | Complied with the requirement. |
| ii) After 2 hours | Variation of gloss, cloudiness, whitening, degree of discoloration not larger than control sample. No abnormality | Complied with the requirement. |

TABLE 3

| Type of Test | Requirement | Results |
| --- | --- | --- |
| 2. Acid Resistance to (Conc. Sulphuric acid 95–97%) (After 24 hours, soaking) | | |
| a) Red coating on iron plate | | |
| i) Immediately after removal from the acid | No blistering, cracking, peeling, pinhole and softening, coloration, and turbidity (Solution) | Complied with the requirement. |

TABLE 3-continued

| Type of Test | | Requirement | Results |
|---|---|---|---|
| | ii). After 2 hours | Variation of gloss, cloudiness, whitening, degree of discoloration not larger than control sample. No abnormality | Complied with the requirement. |
| b) | White Coating on iron plate | | |
| | i). Immediately after removal from the acid | No blistering, cracking, peeling, pinhole and softening, coloration and turbidity (solution). | Complied with the requirement. |
| | ii) After 2 hours | Variation of gloss, cloudiness, whitening, degree of discoloration not larger than control sample. No abnormality | Complied with the requirement. |

TABLE 4

| Type of Test | | Requirement | Results |
|---|---|---|---|
| 3. Acid Resistance to concentrated Nitric Acid 65% (After 24 hours, soaking) | | | |
| a) | Red coating on iron plate | | |
| | i) Immediately after removal from the acid | No blistering, cracking, peeling, pinhole and softening, coloration, and turbidity (Solution) | Complied with the requirement. |
| | ii). After 2 hours | Variation of gloss, cloudiness, whitening, degree of discoloration not larger than control sample. No abnormality | Complied with the requirement. |
| b) | White Coating on iron plate | | |
| | i). Immediately after removal from the acid | No blistering, cracking, peeling, pinhole and softening, coloration and turbidity (solution). | Complied with the requirement. |
| | ii) After 2 hours | Variation of gloss, cloudiness, whitening, degree of discoloration not larger than control sample. No abnormality | Complied with the requirement. |

TABLE 5

| Type of Test | | Result |
|---|---|---|
| 6. Thermal Isolation Test | | |
| a) Inside temperature of the flower pot after being exposed under the sun for 1 hour. | | |
| Covered with white coated metal panel | | 38.5° C. |
| Covered with uncoated metal panel. | | 41.0° C. |
| b) Temperature of the metal surface after being exposed under the sun for 1 hour. | | |
| White coated metal panel | | 40.0° C. |
| Uncoated metal panel | | 46.0° C. |

TABLE 6

| Type of Test | | Result |
|---|---|---|
| 5. High heat resistance test (after 20 minutes exposure to flame from a bunsen burner and dipping immediately into cold water) | | |
| a) | Red coating on iron plate | No cracking, wrinkling, melting, abnormality and other coating film defects |
| b) | White coating on iron plate | No cracking, wrinkling, melting, abnormality and other coating film defects |

TABLE 7

| Type of Test | | Requirement | Result |
|---|---|---|---|
| 4. Salt Spray Test (after 96 hours, soaking) | | | |
| a) | Red coating on iron plate | No blisting, softening sign of corrosion and other sign of deterioration. | Complied with the requirements. |
| b) | White Coating on iron plate | No blistering, softening sign of corrosion and other sign of deterioration. | Complied with the requirement. |

TABLE 8

| | Type of Test | Time | Requirement | Observation | Result |
|---|---|---|---|---|---|
| 2.a) | Alkali Resistance (Red Sample) | 24 hours | No blistering, Cracking, peeling, pinhole and softening, coloration and turbidity (solution) | Immediate completion | Complied with the requirement. |
| | | | Variation of gloss, cloudiness, whitening, degree of discoloration not larger than control sample. No abnormality. | After 2 hours | Complied with the requirement. |
| b) | Alkali Resistance (White Sample) | 24 hours | No blistering, cracking, peeling, pinhole and softening, coloration and turbidity (solution) | Immediate Completion | Complied with the requirement. |
| | | | Variation of gloss, cloudiness, whitening, degree of discoloration not larger than control | After 2 hours | Complied with the requirement. |

TABLE 8-continued

| Type of Test | Time | Requirement | Observation Result |
|---|---|---|---|
| | | | sample. No abnormality |

I claim:

1. A water-based coating composition comprising (a) a heat-resistant metal oxide which is ferric oxide or an oxide of titanium, and (b) a siliceous material selected from the group consisting of expanded perlite, feldspar and diatomaceous earth, both (a) and (b) being present in finely divided form, dispersed in an aqueous solution of sodium metasilicate;

wherein when (a) is said oxide of titanium, the weight ratio of (a) to (b) to said sodium metasilicate is 4:3:16, and wherein when (a) is ferric oxide, the weight ratio of (a) to (b) to said sodium metasilicate is 4:3:17.

2. A composition according to claim 1, in which the titanium oxide (a) is $TiO_2$.

3. A composition according to claim 1, in which (b) comprises expanded perlite which has an apparent specific gravity in the range 0.24 to 0.34.

4. A method of producing a coating on a substrate which comprises applying to said substrate a layer of a composition as claimed in claim 1, and curing the said layer by drying.

5. A method of producing a coating on a substrate which comprises applying to said substrate a layer of a composition as claimed in claim 2, and curing the said layer by drying.

6. A method of producing a coating on a substrate which comprises applying to said substrate a layer of a composition as claimed in claim 3, and curing the said layer by drying.

7. A method according to claim 4, in which the substrate is a metal substrate.

8. A method according to claim 7, in which the metal substrate comprises iron.

9. A method according to claim 4, in which the said layer is dried and cured at ambient temperature for at least 24 hours.

10. A method according to claim 4, in which the said layer is dried and cured by calcining at a temperature of 500° to 800° C. for a period of about 30 minutes.

* * * * *